United States Patent
Al-Kabra et al.

(10) Patent No.: US 10,492,063 B2
(45) Date of Patent: Nov. 26, 2019

(54) AGGREGATING NETWORK CELL DATA TO ADDRESS USER PRIVACY

(71) Applicant: T-Mobile USA, Inc., Bellevue, WA (US)

(72) Inventors: Rami Al-Kabra, Bothell, WA (US); Prem Kumar Bodiga, Bellevue, WA (US); Noah Dahlstrom, Seattle, WA (US); Kevin Rivard, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/965,193

(22) Filed: Apr. 27, 2018

(65) Prior Publication Data

US 2019/0335326 A1  Oct. 31, 2019

(51) Int. Cl.
| | | |
|---|---|---|
| H04M 1/66 | (2006.01) | |
| H04W 12/02 | (2009.01) | |
| G06F 21/62 | (2013.01) | |
| H04W 24/08 | (2009.01) | |
| G06F 16/28 | (2019.01) | |

(52) U.S. Cl.
CPC ........ *H04W 12/02* (2013.01); *G06F 21/6254* (2013.01); *H04W 24/08* (2013.01); *G06F 16/285* (2019.01)

(58) Field of Classification Search
CPC ... H04W 12/02; H04W 24/08; G06F 21/6354; G06F 17/30598; H04L 67/22; H04L 41/0893; H04L 61/2539; G06Q 30/02
See application file for complete search history.

(56) References Cited

U.S. PATENT DOCUMENTS

| | | | |
|---|---|---|---|
| 8,909,711 B1 | 12/2014 | Staddon et al. | |
| 2002/0160781 A1* | 10/2002 | Bark | H04W 52/325 455/450 |
| 2006/0123462 A1 | 6/2006 | Lunt et al. | |
| 2010/0313009 A1* | 12/2010 | Combet | G06Q 30/0204 713/150 |
| 2011/0255688 A1 | 10/2011 | Spalink et al. | |
| 2013/0084878 A1* | 4/2013 | Chen | H04W 72/10 455/452.1 |
| 2015/0177005 A1 | 6/2015 | Steinmetz et al. | |
| 2015/0302481 A1* | 10/2015 | Callahan | G06Q 30/0269 705/7.29 |
| 2016/0142379 A1* | 5/2016 | Tawakol | H04L 63/0421 726/1 |

(Continued)

OTHER PUBLICATIONS

PCT Search Report and Written Opinion dated Aug. 9, 2019 for PCT Application No. PCT/US2019/024859, 10 pages.

*Primary Examiner* — Barry W Taylor
(74) *Attorney, Agent, or Firm* — Lee & Hayes, P.C.

(57) ABSTRACT

A computing system may automatically determine if data traffic of an individual network cell, or other relatively small portion of a network, is sufficiently complex so as to desirably maintain privacy of individual users of the network. Data traffic, which may include phone calls, text messaging, Internet browsing, and so on, of a network cell in a rural area may experience a relatively low volume of data traffic. On the other hand, a cell tower in a city may experience data traffic of hundreds or so individual users during a one-day period. Data traffic of such relatively high volume may be sufficiently complex and may be aggregated and used for data analytics.

19 Claims, 4 Drawing Sheets

(56) References Cited

U.S. PATENT DOCUMENTS

2018/0027416 A1\* 1/2018 Bickford ............... H04W 12/12
2018/0109918 A1   4/2018 Colonna et al.
2018/0268167 A1\* 9/2018 Alberton ........... G06F 17/30522

\* cited by examiner

AGGREGATING NETWORK CELL DATA TO ADDRESS USER PRIVACY

BACKGROUND

In recent years, telecommunication devices have advanced from offering simple voice calling services within wireless communication networks to providing users with many new features. Telecommunication devices now provide messaging services such as email, text messaging, and instant messaging. Such devices may also provide data services such as Internet browsing, media services such as storing and playing a library of favorite songs, and location services, just to name a few examples. Thus, telecommunication devices, referred to herein as user devices or mobile devices, are often used in multiple contexts. In addition to such features provided by telecommunication devices, the number of users of these devices have greatly increased. Such an increase in users is expected to continue.

Often, general insights about network users' behavior, and insights about the network itself, may be gained by analyzing data traffic at various scales of the network. For example, information regarding data traffic over individual network cells may be useful for various data analytics. However, when collecting and processing data for such data analysis, it is important to continue to ensure the anonymity of the collected data, even from network cells that experience relatively low numbers of users in a given span of time.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and architectures that allow a computing system to automatically determine if data traffic of an individual network cell, or other relatively small portion of a network, is sufficiently complex so as to desirably enhance privacy of individuals of the network. Such complexity may, for instance, depend on the number of users of the network cell in a given span of time. For example, a cell tower in a city may experience data traffic of a relatively large number of people (e.g., hundreds or so individual users during a one-day period). Data traffic of such a relatively high volume may be too complex to allow for identification of individual users and/or their associated network activities. On the other hand, a cell tower in a rural area may experience relatively lower volumes of data traffic (e.g., a dozen or so individual users during a one-day period). Such a relatively low volume of data traffic can be aggregated and analyzed, according to the disclosure herein, to further safeguard and protect individual user information. Generally, data traffic of a network cell may include phone calls and conversations, video conferencing, text messaging, Internet accessing and browsing, data uploads and downloads (e.g., file sharing and streaming), and so on.

Often, general insights about network users' behavior, and insights about the network itself, may be gained by analyzing data traffic at various scales of the network. For example, information regarding data traffic over individual network cells may be useful for various data analytics. Data analytics may provide useful knowledge for advertisers and network architects and managers, for example. In order to protect user information while enabling these use cases, embodiments herein described are directed to methods and systems that determine if aggregated traffic data is sufficiently complex so as to maintain anonymity during subsequent procedures involving data analytics, such as those performed by third parties. Thus, according to example embodiments of the disclosure, anonymity may be enhanced when collecting data and/or performing data analytics, particularly at network cells or other nodes with relatively low network traffic.

Figure 1:
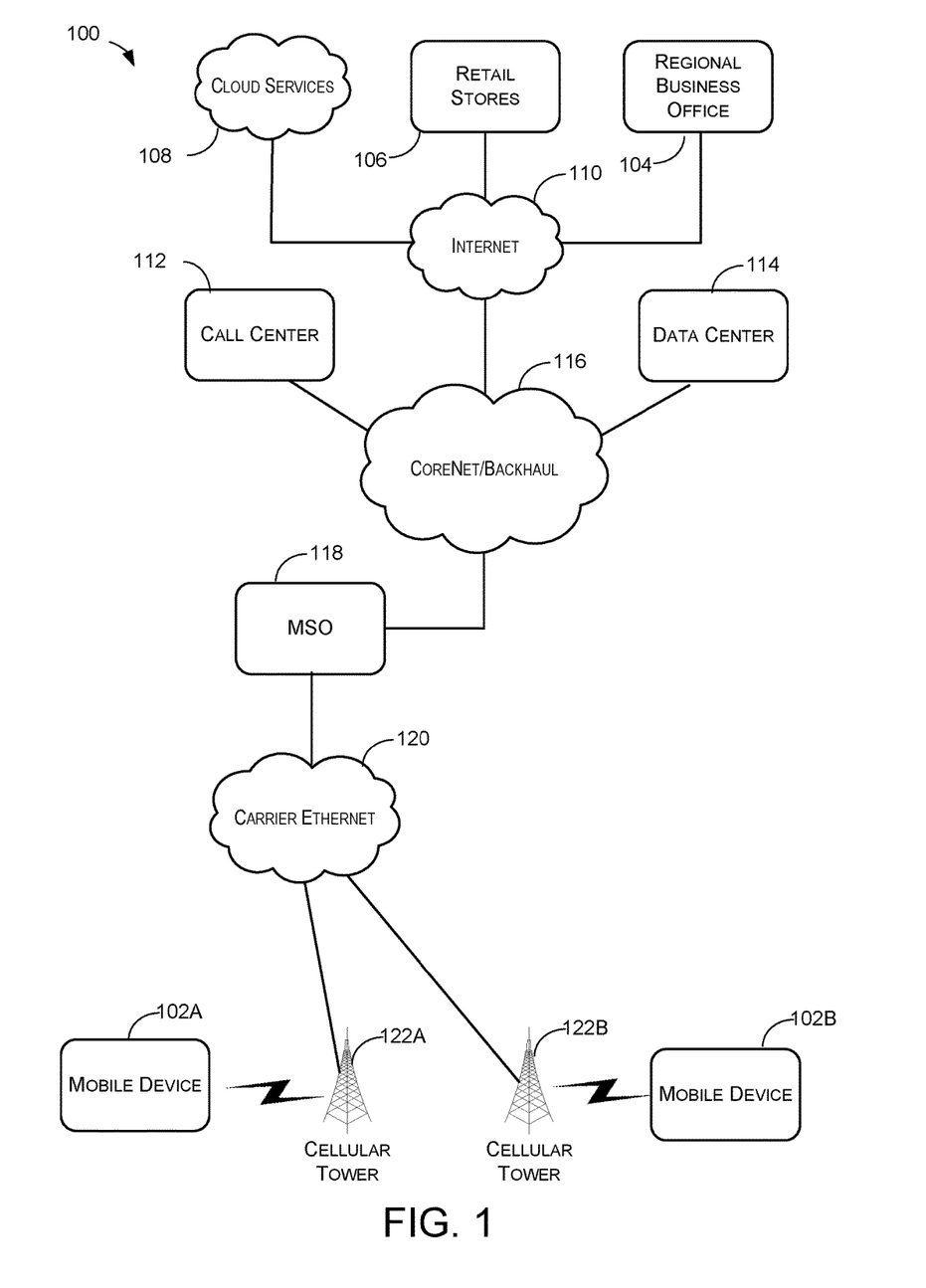
FIG. 1 schematically illustrates a wireless communication network, according to various embodiments.

FIG. 1 schematically illustrates an example of a wireless communication network 100 (also referred to herein as network 100) that may be accessed by mobile devices 102A, 102B (which need not necessarily be mobile and are also referred to herein as client devices), referred to hereinafter, individually or collectively, as mobile devices 102. As can be seen, in various configurations, the wireless communication network 100 includes multiple nodes and networks. The multiple nodes and networks may include one or more of, for example, a regional business office 104, one or more retail stores 106, cloud services 108, the Internet 110, a call center 112, a data center 114, a core net/backhaul network 116, a mobile switch office (MSO) 118, and a carrier Ethernet 120. Wireless communication network 100 may include other nodes and/or networks not specifically mentioned, or may include fewer nodes and/or networks than specifically mentioned. In some examples, network 100 may provide infrastructure for one or more events that occur during an application session.

Access points such as, for example, cellular towers 122A, 122B, can be utilized to provide access to wireless communication network 100 for mobile devices 102. In various configurations, wireless communication network 100 may represent a regional or subnetwork of an overall larger wireless communication network. Thus, a larger wireless communication network may be made up of multiple networks similar to wireless communication network 100 and thus the nodes and networks illustrated in FIG. 1 may be replicated within the larger wireless communication network. In particular, in the example situation illustrated in FIG. 1, mobile device 102A is in a cell serviced by cellular tower 122A and mobile device 102B is in a cell serviced by cellular tower 122B.

In various configurations, mobile devices 102 may comprise any devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, as well as desktop computers, devices configured as Internet of Things (IoT) devices, integrated devices combining one or more of the preceding devices, and/or the like. As such, mobile devices 102 may range widely in terms of capabilities and features. For example, one of mobile devices 102 may have a numeric keypad, a capability to display only a few lines of text and be configured to interoperate with only GSM networks. However, another of mobile devices 102 (e.g., a smart phone) may have a touch-sensitive screen, a stylus, an embedded GPS receiver, and a relatively high-resolution display, and be configured to interoperate with multiple types of networks. The mobile devices may also include SIM-less devices (i.e., mobile devices that do not contain a functional subscriber identity module ("SIM")), roaming mobile devices (i.e., mobile devices operating outside of their home access networks), and/or mobile software applications.

In configurations, wireless communication network 100 may be configured as one of many types of networks and thus may communicate with mobile devices 102 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In embodiments, as previously noted, the wireless communication network 100 may include an IMS 100*a* and thus may provide various services such as, for example, voice over long term evolution (VoLTE) service, video over long term evolution (ViLTE) service, rich communication services (RCS) and/or web real time communication (Web RTC).

Figure 2:
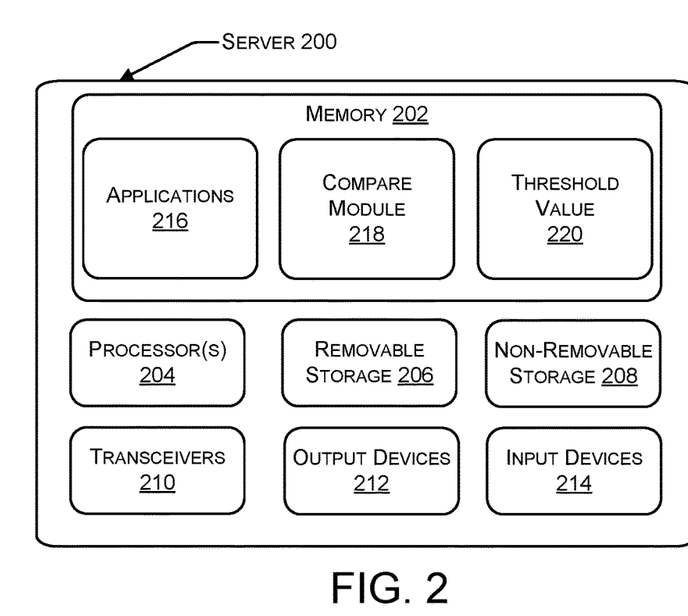
FIG. 2 illustrates a component-level view of an example server configured for use in a wireless communication network.

FIG. 2 schematically illustrates a component-level view of a server 200. Server 200 may be configured as a node for use within a wireless communication network such as 100, according to processes described herein. In some embodiments, server 200 may be a baseband unit (BBU). Server 200 includes a system memory 202, processor(s) 204, a removable storage 206, a non-removable storage 208, transceivers 210, output device(s) 212, and input device(s) 214.

In various implementations, system memory 202 is volatile (e.g., RAM), non-volatile (e.g., ROM, flash memory, etc.) or some combination of the two. In some implementations, processor(s) 204 is a central processing unit (CPU), a graphics processing unit (GPU), or both CPU and GPU, or any other sort of processing unit. System memory 202 may also include applications 216 that allow the server to perform various functions. Among applications 216 or separately, memory 202 may also include a compare module 218 and a threshold value register 220, which are described in detail below.

In some embodiments, server 200 may be a computing system configured to automatically determine if data traffic of an individual network cell (e.g., associated with cellular tower 122), or other relatively small portion of a network, is sufficiently complex so as to desirably maintain privacy of individuals of the network. Accordingly, applications 216 may include code that, upon execution, allows server 200 to record or access from memory information regarding data traffic associated with individual users (e.g., via wireless devices 102) of a network cell of wireless communication network 100; at least partially identify the individual users of the network cell to generate a list of the individual users; determine the number of unique users in the list of the individual users; compare the number to a predetermined threshold; and based at least in part on the comparing, determine whether to categorize the recorded information as anonymized traffic data. In some examples, the predetermined threshold may be stored in a portion of memory 202, such as in threshold value register 220.

Server 200 may also include additional data storage devices (removable and/or non-removable) such as, for example, magnetic disks, optical disks, or tape. Such additional storage is represented in FIG. 2 by removable storage 206 and non-removable storage 208.

Non-transitory computer-readable media may include volatile and nonvolatile, removable and non-removable tangible, physical media implemented in technology for storage of information, such as computer readable instructions, data structures, program modules, or other data. System memory 202, removable storage 206 and non-removable storage 208 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by server 200. Any such non-transitory computer-readable media may be part of server 200.

In some implementations, transceivers 210 include any sort of transceivers known in the art. For example, transceivers 210 may include wired communication components, such as an Ethernet port, for communicating with other networked devices. Also or instead, transceivers 210 may include wireless modem(s) to may facilitate wireless connectivity with other computing devices. Further, transceivers 210 may include a radio transceiver that performs the function of transmitting and receiving radio frequency communications via an antenna.

In some implementations, output devices 212 include any sort of output devices known in the art, such as a display (e.g., a liquid crystal display), speakers, a vibrating mechanism, or a tactile feedback mechanism. Output devices 212 also include ports for one or more peripheral devices, such as headphones, peripheral speakers, or a peripheral display.

In various implementations, input devices 214 include any sort of input devices known in the art. For example, input devices 214 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 3:
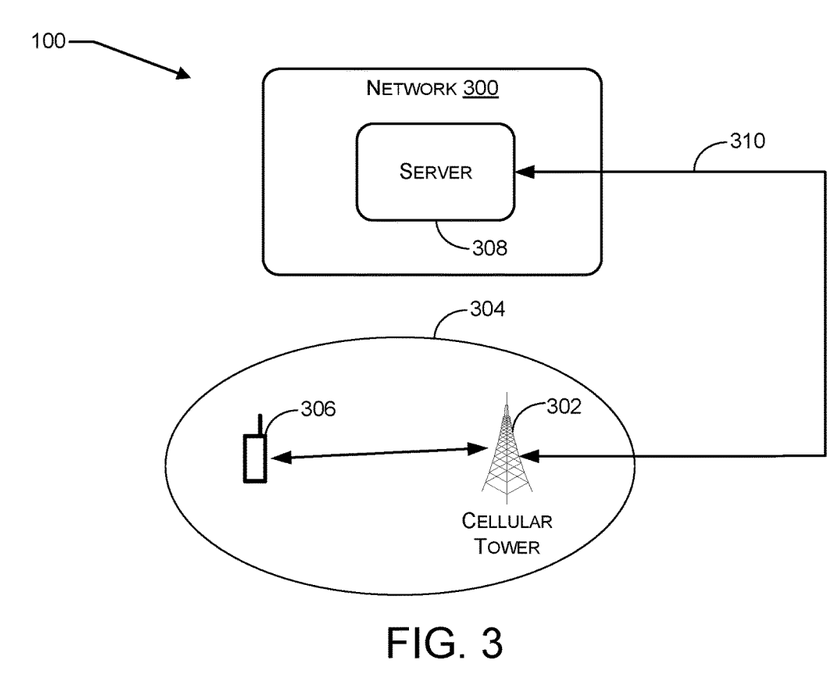
FIG. 3 schematically illustrates a wireless communication network, according to various embodiments.

FIG. 3 schematically illustrates a wireless communication network 300, according to various embodiments. In particular, network 300, which may be a subset of wireless communication network 100, includes a cellular tower 302 that establishes a network cell 304. A wireless device 306 is located within network cell 304. Cellular tower 302 and wireless device 306 are wirelessly connected for two-way communication. Network 300 includes a server 308, which may be similar to or the same as server 200, that receives and transmits signals via wired or wireless path 310. Server 308 may, for example, be located in core net/backhaul network 116 or MSO 118 of network 100.

Any number of wireless devices 306 may communicate with cellular tower 302 during a particular span of time. For example, though FIG. 3 merely illustrates one wireless device 306, multiple wireless devices may communicate with cellular tower 302 at the same time or at different times. Such communication is herein referred to as data traffic and may include phone calls and conversations, video conferencing, text messaging, Internet accessing and browsing, data uploads and downloads (e.g., file sharing and streaming), and so on.

In various embodiments, server 308 may record information regarding data traffic associated with individual users of one or more wireless devices 306 in network cell 304. Such information may include metadata (e.g., data quantity, timing, direction, identity of user and type of wireless device, and so on) of phone calls and conversations, video conferencing, text messaging, Internet accessing and browsing, and data uploads and downloads (e.g., file sharing and streaming), just to name a few examples. Server 308 may at least partially identify the individual users of network cell 304 to generate a list of the individual users. In other words, such a list would identify users that are unique among one another, thus eliminating repeat users being listed more than once. Thus, server 308 may determine the number of unique users in the list of the individual users and compare this number to a predetermined threshold, which server 308 may retrieve from threshold value register 220. In one particular example, such a predetermined threshold may be 25. In this case, server 308 may compare the number of unique users in the list of the individual users to 25. Of course, such a specific threshold is merely an example and the claimed subject matter is not so limited.

Based at least in part on the comparing, server 308 may determine whether to categorize the recorded information as anonymized traffic data. Here, the recorded information may be aggregated by combining separate portions of the previously recorded information together by any of a number of techniques. Such aggregating may eliminate associations among various portions of the recorded information so that the aggregated recorded information becomes anonymized. Returning to the particular example of the predetermined threshold being 25, if the number of individhaul users is greater than 25, then server 308 may aggregate the recorded information to generate anonymized traffic data. On the other hand, if the number of individual users is less than 25, server 308 may not aggregate the recorded information because the number of individual users is too small to allow for anonymized traffic data.

Figure 4:
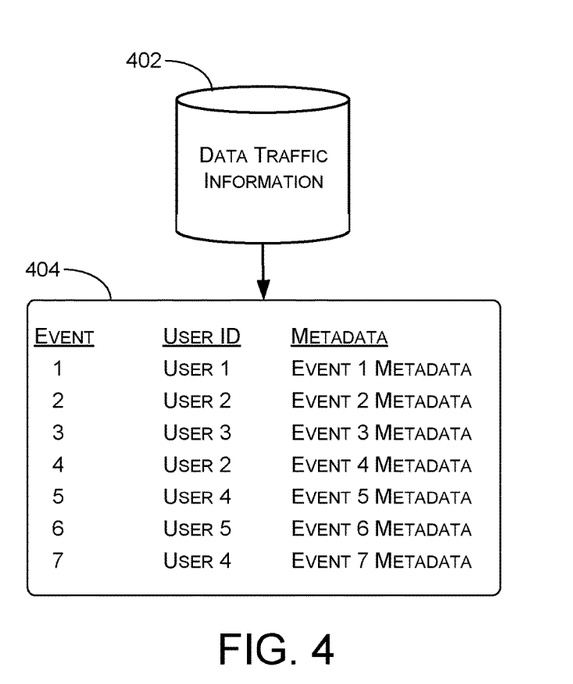
FIG. 4 is a schematic diagram of a database including data regarding network traffic in a network cell, according to some embodiments.

FIG. 4 is a schematic diagram of a database 402 that includes data 404 regarding network traffic in a network cell, according to some embodiments. For example, server 308 may record data 404 in real-time and place such data in database 402 also in real-time or at a later time.

Data 404 may include any of a number of types of information associated with a network event that occurs in the network cell. In some implementations, the data may be categorized by event in a table that includes some type of user identification and metadata associated with particular events. User identification may include phone number, name, or other personal information of a user involved in (e.g., a user who initiated) the event. Metadata may include time of event, phone numbers of wireless devices associated with the event, and type, direction, quantity, and time of data flow of data traffic of the event, etc. For example, in the case of an event being Internet browsing, metadata may include addresses of websites visited and quantity of data uploaded or downloaded between the wireless device and the website(s).

Server 308 may determine the number of unique users in the list or table of events. In particular, server 308 may determine the number of unique users associated with events during a particular time span. For example, such a number may represent the number of users using a network cell to participate in events during a 24-hour period.

In the example table illustrated in FIG. 4, multiple events involve a few individual users. For instance, events 2 and 4 involve user 2 and events 5 and 7 involve user 4. To determine the number of unique users in the table, server 308 may detect such multiple events by individual users and remove these instances of "false" additional users.

Figure 5:
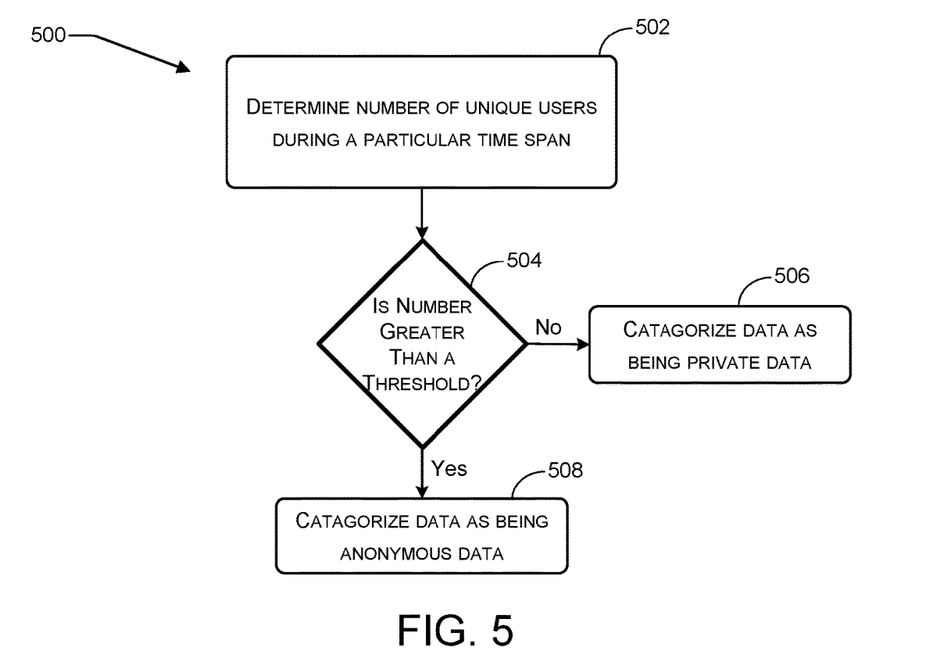
FIG. 5 is a block diagram of a process to determine the type of category in which to place data traffic occurring in a network cell, according to some embodiments.

FIG. 5 is a block diagram of a process 500 to determine the type of category in which to place data traffic occurring in a wireless communication network. For example, process 500 may be performed by server 308, illustrated in FIG. 3, or more specifically, in other examples, may be performed by a combination of applications module 216 and compare module 218, illustrated in FIG. 2. One of ordinary skill in the art will recognize that the process 500 may be performed in any number of appropriate ways, including but not limited to these examples.

At block 502, server 308 may determine the number of unique users of a network cell during a particular time span. During this time span, this number of unique users engaged in network events that resulted in data traffic. At diamond 504, server 308 may determine whether the number of unique users is greater than a predetermined threshold. If so, then process 500 proceeds to block 506 where the data traffic associated with the unique users is categorized as being anonymous data. In this case, the relatively high number of users would make it difficult to subsequently identify the individual users based on the data traffic (wherein the data traffic does not explicitly include user identification). For example, the data traffic is not relatable to or associated with individual users.

On the other hand, if server 308 determines that the number of unique users is less than the predetermined threshold then process 500 proceeds to block 508 where the data traffic associated with the unique users is categorized as being private data. In this way, the data traffic may be categorized for further processing. In some example embodiments, the data traffic categorized as private data, by the processes of block 508, may not be shared with other parties and/or may not be used for data analytics.

Figure 6:
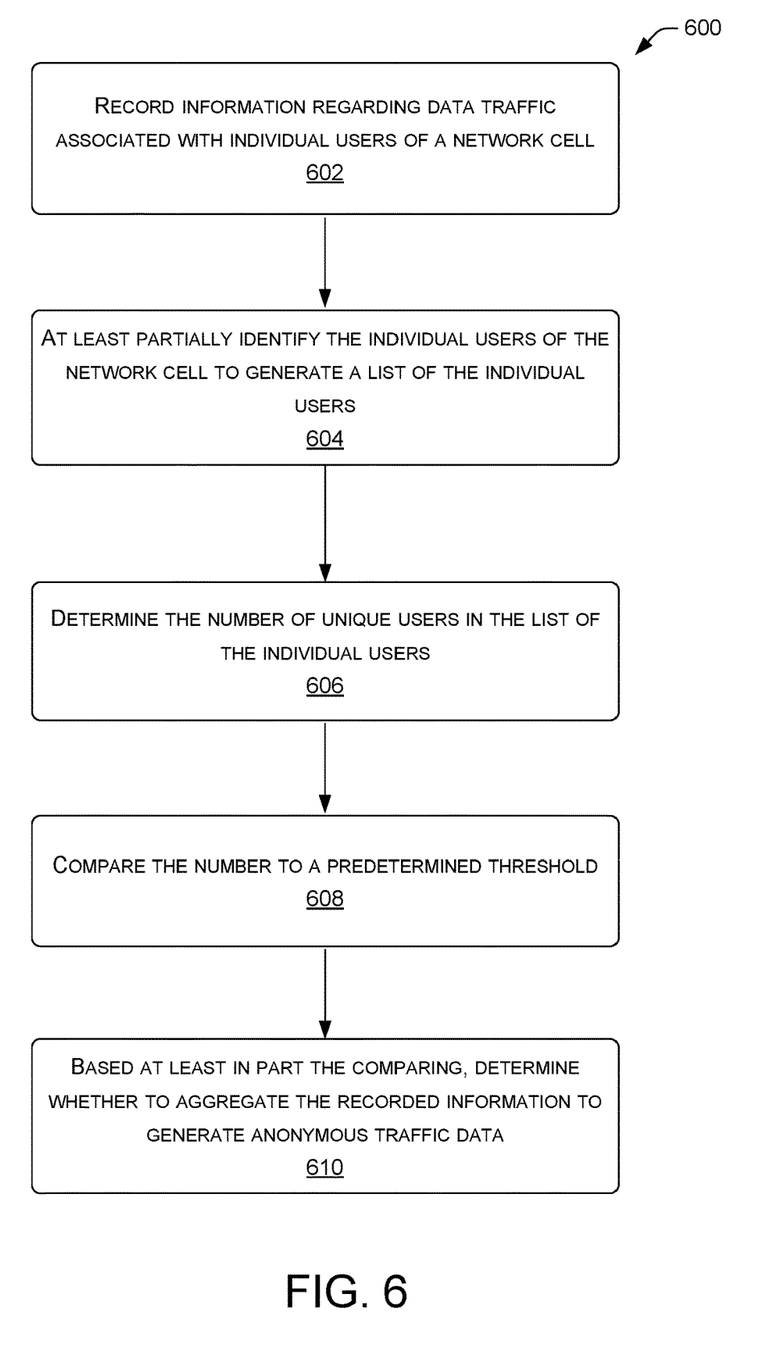
FIG. 6 is a flow diagram of a process for anonymizing traffic data in a network cell, according to various embodiments.

FIG. 6 is a flow diagram of a process 600 for anonymizing traffic data in a network cell, according to various embodiments. For example, process 600 may be performed by server 308, illustrated in FIG. 3, or more specifically, in other examples, may be performed by a combination of applications module 216 and compare module 218, illustrated in FIG. 2. One of ordinary skill in the art will recognize that the process 600 may be performed in any number of appropriate ways, including but not limited to these examples.

At block 602, the server may record information regarding data traffic associated with individual users of a network cell. Such recording may be performed during a particular time span, such as a 24-hour period, for example. The information regarding the data traffic may include the type of the data traffic, direction of the data traffic, quantity of the data traffic, and time of data flow of the data traffic, just to name a few examples. The data traffic may be associated with, for example, phone calls to or from one or more of the individual users via the network cell.

At block 604, the server may at least partially identify the individual users of the network cell to generate a list of the individual users. Such a list may be in the form of a data table, such as that illustrated in FIG. 4, for example. Identifying the individual users of the network cell may be performed by associating the individual users with respective phone numbers of the individual users. In some examples, the list of the individual users comprises a list of the individual users associated with data traffic that occurs within a particular time span.

At block 606, and as described above regarding FIG. 4, the server may determine the number of unique users in the list of the individual users. At block 608, the server may compare the number of unique users to a predetermined threshold. In some examples, the predetermined threshold is based, at least in part, on the particular time span considered. In some examples, the predetermined threshold is based, at least in part, on a history of usage of the network cell. Considering such history may be useful for improving accuracy of determining whether data traffic is anonymous or not. For example, the predetermined threshold may be increased or decreased depending on whether the history includes many days of relatively few users in a network cell or relatively many users.

At block 610, the server may, based at least in part on the comparing, determine whether to categorize the recorded information as anonymized traffic data. In some examples, the anonymized data traffic is based, at least in part, on the data traffic during the particular time span. If the recorded information is categorized as anonymized data traffic then, for example, such data may be provided to third parties for data analytics or any of a number of other purposes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A computer-implemented method comprising:
recording information regarding data traffic associated with individual users using a cellular tower associated with an individual network cell, the information regarding the data traffic comprising:
a first amount of the data traffic that is uploaded by at least one mobile device corresponding to the individual users,
a second amount of the data traffic that is downloaded by the at least one mobile device,
a type of the data traffic,
a time at which the first amount of the data traffic is uploaded, and
a time at which the second amount of the data traffic is downloaded;
at least partially identifying the individual users using the individual network cell to generate a list of the individual users;
determining the number of unique users using the individual network cell in the list of the individual users;
comparing the number to a predetermined threshold; and
based at least in part on the comparing, determining whether to categorize the recorded information as anonymized traffic data.

2. The computer-implemented method of claim 1, wherein recording the information regarding data traffic is performed during a particular time span, and wherein the list of the individual users comprises a list of individual users associated with the data traffic that occurs within the particular time span.

3. The computer-implemented method of claim 2, wherein the predetermined threshold is based, at least in part, on the particular time span.

4. The computer-implemented method of claim 2, wherein the anonymized traffic data is based, at least in part, on the data traffic during the particular time span.

5. The computer-implemented method of claim 1, wherein at least partially identifying the individual users using the unique network cell comprises:
associating the individual users with respective phone numbers of the individual users.

6. The computer-implemented method of claim 1, wherein the data traffic is associated with phone calls to or from one or more of the individual users via the individual network cell.

7. The computer-implemented method of claim 1, wherein the predetermined threshold is based, at least in part, on a history of usage of the individual network cell.

8. An apparatus comprising:
a non-transitory storage medium; and
instructions stored in the non-transitory storage medium, the instructions being executable by the apparatus to:
record information regarding data traffic associated with individual users using an individual network cell, the information regarding the data traffic comprising:
a first amount of the data traffic that is uploaded by at least one mobile device corresponding to the individual users, and
a second amount of the data traffic that is downloaded by the at least one mobile device;
at least partially identify the individual users using the individual network cell to generate a list of the individual users;
determine the number of unique users using the individual network cell in the list of the individual users;
compare the number to a predetermined threshold; and
based at least in part on the comparing, determine whether to categorize the recorded information as anonymized traffic data.

9. The apparatus of claim 8, wherein recording the information regarding data traffic is performed during a particular time span, and wherein the list of the individual users comprises a list of individual users associated with the data traffic that occurs within the particular time span, and
wherein the anonymized data traffic is based, at least in part, on the data traffic during the particular time span.

10. The apparatus of claim 9, wherein the predetermined threshold is based, at least in part, on the particular time span.

11. The apparatus of claim 8, wherein the information regarding the data traffic includes type of the data traffic, quantity of the data traffic, and time of data flow of the data traffic.

12. The apparatus of claim 8, wherein the data traffic is associated with phone calls to or from one or more of the individual users via the individual network cell.

13. The apparatus of claim 8, wherein the recorded information is categorized as anonymized traffic data when the number is greater than the predetermined threshold, and
wherein the instructions are further executable by the apparatus to:
provide the anonymized data traffic to a third party.

14. A wireless communication network comprising:
one or more processors;
a non-transitory storage medium; and
instructions stored in the non-transitory storage medium, the instructions being executable by the one or more processors to:
record information regarding data traffic associated with individual users using an individual network cell, the information regarding the data traffic comprising:
a first amount of the data traffic that is uploaded by at least one mobile device corresponding to the individual users, and
a second amount of the data traffic that is downloaded by the at least one mobile device;
at least partially identify the individual users using the individual network cell to generate a list of the individual users;
determine the number of unique users using the individual network cell in the list of the individual users;
compare the number to a predetermined threshold; and
categorize the recorded information as private traffic data when the number is below the predetermined threshold.

15. The wireless communication network of claim 14, wherein recording the information regarding data traffic is performed during a particular time span, and wherein the list of the individual users comprises a list of individual users associated with the data traffic that occurs within the particular time span.

16. The wireless communication network of claim 15, wherein the predetermined threshold is based, at least in part, on the particular time span.

17. The wireless communication network of claim 14, wherein the data traffic is associated with phone calls to or from one or more of the individual users via the individual network cell.

18. The wireless communication network of claim 14, wherein the predetermined threshold is based, at least in part, on a history of usage of the individual network cell.

19. The wireless communication network of claim 14, wherein the instructions are executable by the one or more processors to further:
categorize the recorded information as anonymized traffic data when the number is above the predetermined threshold and share the anonymized traffic data with a third party,
wherein the private traffic data is not shared with the third party.

* * * * *